Patented Aug. 4, 1953

2,647,916

UNITED STATES PATENT OFFICE 2,647,916

METHOD OF PREPARING AN N-SUBSTITUTED CARBAMATE

Donald W. Kaiser, Old Greenwich, Conn., assignor to American Cyanamid Company, New York, N. Y., a corporation of Maine No Drawing. Application July 26, 1949, Serial No. 106,977

17 Claims. (Cl. 260—471)

This invention relates to a new and improved method of preparing certain N-substituted carbamates. More particularly it is concerned with the method of preparing an N-substituted carbamate which comprises effecting simultaneous reaction under heat between (1) an alkali-metal cyanate, more particularly a cyanate of sodium, potassium, lithium, rubidium or caesium, (2) a hydrocarbon halide (active hydrocarbon halide) represented by the formula RX, where X represents halogen (e. g., chlorine, bromine, iodine) and R represents a radical selected from the class consisting of alkyl (including cycloalkyl), alkenyl (including cycloalkenyl), aralkyl and aralkenyl radicals, and (3) an alcohol selected from the class consisting of monohydric and dihydric alcohols, e. g., methyl, ethyl, propyl, isopropyl, butyl, sec.-butyl, tert.-butyl, amyl, isoamyl, sec.-amyl, hexyl, cyclohexyl, cyclohexenyl, heptyl, octyl, nonyl, decyl, allyl, metallyl, α-chloroallyl, hexenyl, octenyl, benzyl cinnamyl, etc., alcohols, ethylene glycol, diethylene glycol, triethylene glycol, etc., preferably such an alcohol which is normally a liquid, that is to say, a monohydric or dihydric alcohol of such relatively low molecular weight that it is a liquid at a temperature of the order of 30° C. or lower. The N-substituted carbamate which is thereby produced is then isolated from the resulting reaction mass.

When a monohydric alcohol is employed the desired products of the method may be represented by the formula I

where R has the same meaning as given above with reference to RX in the formula for the hydrocarbon halide of (2) and R' stands for the chain of the monohydric alcohol of (3), more particularly an alkyl (including cycloalkyl), alkenyl (including cycloalkenyl), aralkyl (aryl-substituted alkyl) or aralkenyl (aryl - substituted alkenyl), or other radical corresponding to that present in the normally liquid monohydric alcohol (including alcohol-ether) employed. When a dihydric alcohol is used the products include bis carbamates which may be represented by the formula II
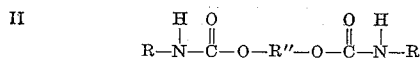

where each R has the same meaning as given above with reference to Formula I and R'' represents a divalent radical corresponding to that present in the dihydric alcohol, which latter may be represented by the formula

Another product of the reaction when a dihydric alcohol is one of the reactants is a carbamate which may be represented by the formula III
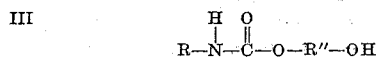

where R and R'' have the same meanings as given above with reference to Formula II.

It was known prior to my invention that carbamates of the kind embraced by Formula I could be prepared by the addition of a monohydric alcohol to an isocyanate or by reaction between a chlorocarbonate and an amine, but the resulting carbamates are costly due, for one reason, to the relatively high cost of the isocyanate or amine reactants used in their preparation. Furthermore, both the isocyanates and the chlorocarbonates constitute a health hazard to workmen when these materials are employed in chemical reactions.

The present invention is based on my discovery that N-substituted carbamates of the kind embraced by Formulas I, II and III can be produced in adequate yields from relatively inexpensive, non-toxic materials as briefly described in the first paragraph of this specification and more fully hereafter. More particularly I have found that such N-substituted carbamates can be prepared by heating under atmospheric pressure or, preferably, under superatmospheric pressure, e. g., at pressures ranging from 20 pounds to 10,000 pounds or more per square inch, and at a temperature within the range of about 100° C. to about 175° C., or a little higher, e. g., about 200° C. a mixture containing the ingredients described under (1), (2) and (3) in the first paragraph of this specification. Reaction at atmospheric pressure, e. g., by heating at such pressure under reflux at the boiling temperature of the reaction mass, is generally less satisfactory from a practical standpoint. The reaction mass is preferably agitated, e. g., by mechanical stirring, during the reaction period, which may range, for instance, from ½ hour to 24 hours or longer, depending upon the size of the batch, the reactants and molar proportions thereof which are employed, kind of apparatus used, and other influencing factors. In those cases wherein the alkali-metal cyanate, e. g., potassium cyanate, is not completely soluble in the reaction mass, an inert (i. e., inert during the reaction) solubilizing agent is advantageously incorporated into the reaction mass for improving or increasing the solubility of the alkali-metal cyanate therein. Inert, non-hydroxylated solubilizing agents can be employed for this purpose, acetonitrile being especially suitable for use. Examples of other solubilizing agents that can be used, although less effective than acetonitrile, are propionitrile, β-methoxypropionitrile, dimethylcyanamide, acetone, dioxane and nitrobenzene.

When a monohydric alcohol is employed and taking potassium cyanate as illustrative of the alkali-metal cyanate, the reaction may be illustrated by the following equation:

IV $\quad KOCN + RX + R'OH \longrightarrow KX + R\underset{|}{\overset{H}{N}}-COOR'$ where X represents halogen, e. g., chlorine, bromine or iodine and preferably chlorine, and R and R' have the same meanings as given above with reference to Formula I. The reaction probably proceeds through stages which may be represented by the following equations:

V $\quad KOCN + RX \longrightarrow KX + RNCO$

VI $\quad RNCO + R'OH \leftrightarrows R\underset{|}{\overset{H}{N}}-COOR'$

There is also some evidence that a side reaction leading to the formation of an unsubstituted carbamate occurs. It is conceivable that this side reaction takes place through several stages which may be illustrated by the following equations:

VII $\quad RX + R'OH \rightarrow ROR' + HX$

VIII $\quad KOCN + HX \rightarrow HNCO + KX$

IX $\quad HNCO + R'OH \rightarrow H_2N-COOR'$

The above views are supported by the fact that the larger the amount of monohydric alcohol (e. g., methanol) employed, the larger (other conditions being the same) is the amount of N-unsubstituted carbamate that is formed.

The mechanism of the reaction is probably of the same general character when a dihydric alcohol is used in place of a monohydric alcohol, the products of the reaction including a bis carbamate (see Formula II) as the main product and a hydroxy derivative (see Formula III) as another product.

The weight of the evidence indicates that, in the method of my invention, the alkali-metal cyanate functions both as an acid (hydrohalide) acceptor and as a substance capable of reaction with an active hydrocarbon halide of the kind previously described, e. g. benzyl, phenylethyl and other aralkyl chlorides, bromides and iodides; methyl, ethyl, propyl, isopropyl, butyl, amyl, isoamyl, hexyl, heptyl, octyl, nonyl, decyl and other alkyl chlorides, bromides and iodides; allyl, methallyl, crotyl, pentenyl, ethallyl, hexenyl, heptenyl, octenyl and other alkenyl chlorides, bromides and iodides; and alpha-phenylallyl and other aralkenyl chlorides, bromides and iodides.

It was quite surprising and unexpected that an alkali-metal cyanate, an active hydrocarbon halide of the kind described under (2) of the first paragraph herein and an alcohol of the kind described under (3) of the first paragraph of this specification could be caused to react together to yield the aforementioned N-substituted carbamates, since ordinarily it would be expected that, if any reaction occurred, the reaction might take the following course to yield an iminocarbonate. In Equations X and XI the cyanate is shown for purpose of illustration as potassium cyanate.

X $\quad KOCN + RX \longrightarrow ROCN + KX$

XI $\quad ROCN + R'OH \longrightarrow \underset{R'O}{\overset{RO}{\diagdown}}C=NH$ The molar ratios of reactants may be varied fairly widely, since the excess over stoichiometrical proportions is merely present in the reaction mass as unreacted or partly reacted material. For example, all of the reactants can be used in equal molar proportions, or with the alkali-metal cyanate or the hydrocarbon halide in excess of the other, e. g., from 0.5 to 25 or 30 mole per cent, or even as much as 50 mole per cent, of the one in excess of the other. The alcohol reactant can be used in a molar amount which is the same as that of the other reactants, or it can be employed in excess of either, e. g., from 0.5 to 2500 or 3000 mole per cent in excess. The use of even larger amounts of alcohol reactant is not precluded, especially when larger yields of an N-unsubstituted carbamate are desired. Good results have been obtained by using the alcohol reactant in a molar amount corresponding to from 2 to 10 times the molar amount of alkali-metal cyanate employed. When a dihydric alcohol is used, it can be employed in stoichiometrical proportions with either the alkali-metal cyanate or the hydrocarbon halide, or in excess thereof as has been mentioned above.

In order that those skilled in the art better may understand how the present invention can be carried into effect, the following examples are given by way of illustration and not by way of limitation. All parts and percentages are by weight.

*Example 1*

|  | Parts | Approx. Molar Ratios |
|---|---|---|
| Benzyl chloride | 126.5 | 1.0 |
| Potassium cyanate | 81.1 | 1.0 |
| Methanol | 398.0 | 12.4 | were heated and agitated together under reflux at the boiling temperature of the mass for 10 hours. The excess methanol was distilled off under reduced pressure, the residue was filtered to remove the KCl (by-product of the reaction), and the oily filtrate was distilled. Solid separated in the distillate, which boiled within the range of 163°–166° C., during distillation. The total distillate weighed 61 parts and was mostly benzyl methyl ether. Filtration of the distillate yielded 17 parts of crystals, which were washed with hexane. The purified crystals melted at 64°–65° C., which is the recorded melting point for methyl N-benzyl carbamate.

*Example 2*

|  | Parts | Approx. Molar Ratios |
|---|---|---|
| Potassium cyanate (94.2%) | 86.0 | 1.0 |
| Allyl chloride | 76.5 | 1.0 |
| Methanol | 159.2 | 4.97 |

A mixture of the above ingredients was heated and agitated for 3 hours at 150° C. in an autoclave under superatmospheric pressure. The solid which was filtered from the cold reaction mass contained only a trace of potassium cyanate. After stripping the low-boiling fraction from the filtrate, the residue was distilled under reduced pressure. There was obtained 75.5 parts of colorless liquid which boiled at 78° C. at 14 mm. This corresponds to a yield of 65.6% of crude methyl N-allylcarbamate. Analysis of this crude product for nitrogen, without further purification, gave the following results:

|  | Per cent N |
|---|---|
| Calculated for $C_5H_9O_2N$ | 12.17 |
| Found | 13.75 |

The methyl carbamate which was present in the crude product was isolated by diluting the crude product with benzene, washing the benzene solution with water, and then evaporating the aqueous extract to dryness.

*Example 3*

This example illustrates the use of an inert solubilizing agent, specifically acetonitrile, for improving the solubility of the alkali-metal cyanate, specifically potassium cyanate, in the reaction mass.

|  | Parts | Approx. Molar Ratios |
|---|---|---|
| Potassium cyanate (94.2%) | 86.0 | 1.0 |
| Allyl chloride | 80.5 | 1.05 |
| Methanol | 64.0 | 2.0 |
| Acetonitrile | 234.8 | 5.7 |

A mixture of the above ingredients was heated and agitated for 3 hours at 150° C. in an autoclave under superatmospheric pressure. The reaction mass was cooled, and the solid matter present therein was filtered off and discarded. The low-boiling fraction was removed from the filtrate by heating on a steam bath, after which the residue was distilled under reduced pressure. Distillation at 80°–84° C. under approximately 15 mm. pressure gave 72 parts of colorless oil. This corresponded to a yield of 62.5% of crude methyl N-allylcarbamate. This fraction gave the following nitrogen analysis:

|  | Per cent N |
|---|---|
| Calculated for $C_5H_9O_2N$ | 12.17 |
| Found | 12.55 |

Using a short head, the residue from the above distillation was distilled under a pressure of 0.5 mm. The material boiled over a range of 110°–140° C., and 15 parts of a mixture of triallyl isocyanurate and diallylurea was obtained, the latter probably being formed as the result of the presence of a slight quantity of water, according to the following equation:

XII 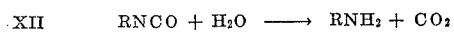

XIII 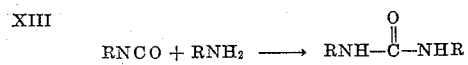

The triallyl isocyanurate undoubtedly resulted from trimerization of allyl isocyanate before it reacted with the alcohol.

Additional examples involving the use of potassium cyanate, allyl chloride and methanol, and in which the reaction conditions and proportions of reactants were varied, are given hereinafter. The term "crude product" with reference to yield means that methyl carbamate was not separated from the product.

*Example 4*

|  | Parts | Approx. Molar Ratios |
|---|---|---|
| Potassium cyanate (94.2%) | 43.0 | 1 |
| Allyl chloride | 38.2 | 1 |
| Methanol | 398.0 | 24.8 |

*Conditions of reactions.*—Heated with agitation in an autoclave under superatmospheric pressure for 5 hours at 125° C.

*Results.*—The reaction yielded 31.8 parts of a mixture of methyl carbamate and methyl N-allylcarbamate. Filtration of the distillate gave 10 parts of methyl carbamate. A benzene solution of the filtrate was washed with 25 parts of water and redistilled. A nitrogen analysis of the product (methyl N-allylcarbamate) showed the following:

|  | Per cent N |
|---|---|
| Calculated for $C_5H_9O_2N$ | 12.17 |
| Found | 12.55 |

The refractive index of the thusly purified sample was 1.4463 at 25° C.

*Example 5*

|  | Parts | Approx. Molar Ratios |
|---|---|---|
| Potassium cyanate (94.2%) | 86.0 | 1 |
| Allyl chloride | 76.5 | 1 |
| Methanol | 159.2 | 4.97 |

*Conditions of reaction.*—Heated with agitation in an autoclave under superatmospheric pressure for 5 hours at 125° C.

*Results.*—Distillation at a pressure of 10 mm. gave 70 parts of liquid which distilled at 74°–76° C. No solid separated in the condenser. The yield of crude product was 61%.

*Example 6*

Same as in Example 5 with the exception that 79.6 parts of methanol was used. Distillation yielded 52.5 parts of distillate boiling at 80°–90° C. at 15–16 mm. pressure. The residue amounted to 10 parts. The yield of crude product was 45.6%.

*Example 7*

Same as in Example 5 with the exception that about 107.5 parts (about 1.25 moles) of 94.2% potassium cyanate was employed. Upon distillation there was obtained 63.2 parts of liquid containing a small amount of solid. The distillate boiled at 67°–72° C. at 10 mm. pressure. The yield of crude product was 55%.

*Example 8*

Same as in Example 5 with the exception that the reactants were heated with agitation in an autoclave under superatmospheric pressure for 1 hour at 150° C. Distillation yielded 75 parts of crude product in a yield of 65%. Extraction with water gave 6 parts of methyl carbamate. A nitrogen analysis of the salt (KCl) which was separated from the reaction mass indicated the presence of only a slight amount of unreacted potassium cyanate.

*Example 9*

Same as in Example 5 with the exception that about 95.6 parts (about 1.25 moles) of allyl chloride was used. Upon distillation there was obtained 70 parts of liquid boiling at 66°–69° C. at 9 mm. pressure. A large amount of black resinous material remained as a residue. The product was diluted with benzene and washed with water. Evaporation of the washings yielded 7 parts of methyl carbamate. The yield of crude produce was 61%.

*Example 10*

Same as in Example 6 with the exception that the reactants were heated with agitation in an autoclave under superatmospheric pressure for 3 hours at 150° C. After removal of the excess methanol by distillation, the resulting reaction mass was very dark in color and contained a large amount of solid material. It was therefore diluted with benzene and washed with 60 parts of water. Distillation of the diluted and washed material yielded 49 parts of liquid which boiled at 67° C. under a pressure of 10 mm., leaving about 15–20 parts of a tarry residue. Evaporation of the washings gave 11 parts of solid material (mainly methyl carbamate). The yield of purified methyl N-allylcarbamate, that is, product from which methyl carbamate had been separated, was 42.6%.

*Example 11*

|  | Parts | Approx. Molar Ratios |
| --- | --- | --- |
| Potassium cyanate (94.2%) | 43.0 | 1.0 |
| Allyl chloride | 42.0 | 1.1 |
| Methanol | 79.6 | 4.97 |

The allyl chloride was added to the mixture of potassium cyanate and methanol heated to about 150° C. over a period of 35 minutes under a pressure of about 180 to 220 pounds per square inch, after which the reaction mass was heated for an additional 25 minutes at the same temperature under a pressure of about 170 to 187 pounds per square inch. After removal of the excess methanol the resulting dark and viscous reaction mass was treated with benzene and water as described under Example 10. Distillation yielded 18.6 parts of methyl N-allylcarbamate. The yield of purified material was 32.6%.

*Example 12*

|  | Parts | Approx. Molar Ratios |
| --- | --- | --- |
| Potassium cyanate (94.2%) | 86.0 | 1.0 |
| Allyl chloride | 84.5 | 1.1 |
| Methanol | 159.2 | 4.97 |
| Water | 10.0 | 0.55 |

The mixture of the above reactants was heated with agitation in an autoclave under superatmospheric pressure for 1 hour at 150° C. The resulting reaction mass was filtered, and the methanol was removed from the filtrate by distillation. The filtrate was diluted with benzene and washed with water. Distillation of the benzene solution yielded 27.6 parts of methyl N-allylcarbamate. Evaporation of the aqueous solution yielded 21.5 parts, which corresponds to a yield of 28.7%, of methyl carbamate. The yield of purified methyl N-allylcarbamate was 24%.

*Example 13*

Same as in Example 10 with the exception that 119.4 parts of methanol was used instead of 79.6 parts as in Example 10, and the reaction mass was heated at 150° C. for only 1 hour. Distillation of the reaction mass yielded 70.7 parts of liquid boiling at 70°–72° C. under a pressure of 16 mm. The product was dissolved in about 88 parts of benzene, and the resulting solution was washed with 50 parts of water. The yield of crude product was 61%. Distillation of the washed, benzene solution of the product gave 51.5 parts of methyl N-allylcarbamate, which corresponds to a yield of 45% of purified material.

*Example 14*

|  | Parts | Approx. Molar Ratios |
| --- | --- | --- |
| Potassium cyanate (94.2%) | 86.0 | 1.0 |
| Allyl chloride | 80.5 | 1.05 |
| Methanol | 35.2 | 1.1 |
| Acetonitrile | 234.8 | 5.7 |

The mixture of the above reactants was heated in an autoclave for three hours at 150° C. Distillation of the resulting reaction mass yielded the following cuts:

(1) 53 parts, B. P. 78°–81° at 12 mm.; and
(2) 14 parts, B. P. 105°–120° at 0.5 mm., which was a mixture of diallylurea and triallyl isocyanurate.

The yield of purified methyl N-allylcarbamate was 46%.

*Example 15*

|  | Parts | Approx. Molar Ratios |
| --- | --- | --- |
| Sodium cyanate | 65.0 | 1.0 |
| Allyl chloride | 80.5 | 1.05 |
| Methanol | 64.1 | 2.0 |
| Acetonitrile | 234.8 | 5.7 |

The conditions of reaction in this example were the same as those described under Example 14. Some unreacted sodium cyanate remained in the reaction mass. Upon distillation there was obtained 25.5 parts of liquid boiling at 76°–79° C. under a pressure of 13 mm. The yield of purified methyl N-allylcarbamate was 22%.

*Example 16*

This example illustrates the preparation of n-butyl N-allyl carbamate.

|  | Parts | Approx. Molar Ratios |
| --- | --- | --- |
| Potassium cyanate (94.2%) | 86.0 | 1.0 |
| Allyl chloride | 80.5 | 1.05 |
| n-Butanol | 148.0 | 2.0 |
| Acetonitrile | 313.1 | 7.64 |

The mixture of the above ingredients was heated with agitation for 3 hours at 150° C. in an autoclave under superatmospheric pressure. After filtering off the solid, the filtrate was distilled to obtain the following fractions:

| Cut | B. P., °C. | Pressure, mm. | Parts |
| --- | --- | --- | --- |
| I | 108–112 | 15 | 84.5 |
| II | 82–105 | 0.15 | 11.5 |
| III | 110–130 | 0.15 | 5.0 |

Cuts I and II were combined and redistilled to obtain the following cuts:

| Cut | B. P., °C. | Pressure, mm. | Parts | Percent Yield |
|---|---|---|---|---|
| A | 52-68 | 0.05 | 6.0 | |
| B | 68-74 | 0.05 | 71.0 | 45.3 |
| C | 98 | 0.05 | 9.5 | |
| Residue | | | 6.5 | |

Cut B comprising mainly n-butyl N-allylcarbamate was redistilled. Analysis of a middle fraction for nitrogen gave the following results:

Percent N
Calculated for $C_8H_{15}O_2N$ _____ 8.92
Found _____ 8.87

Example 17

This example illustrates the preparation of allyl N-allylcarbamate. As in the previous example, acetonitrile was used to increase the solubility of the potassium cyanate in the reaction mass.

| | Parts | Approx. Molar Ratios |
|---|---|---|
| Potassium cyanate (94.2%) | 86.0 | 1.0 |
| Allyl chloride | 80.5 | 1.05 |
| Allyl alcohol | 116.0 | 2.0 |
| Acetonitrile | 313.1 | 7.64 | were carefully dried and then heated together in an autoclave for 3 hours at 150° C. under a pressure of about 140 pounds per square inch. The solid was filtered off, and the filtrate was distilled to obtain the following high-boiling fractions:

| Cut | Compound | B. P., °C. | Pressure, mm. | Parts | Percent Yield |
|---|---|---|---|---|---|
| I | Allyl N-allylcarbamate. | 61-85 | 1.5-0.25 | 96 | 68 |
| II | Triallyl isocyanurate. | 94-109 | 0.25 | 4 | |
| III | Diallylurea | 110-140 | 0.25 | 7 | |

Cut I was redistilled to obtain a purer form of allyl N-allylcarbamate, B. P. 69°-73° C. at 0.05 mm., which gave the following nitrogen analysis:

Per cent N
Calculated for $C_7H_{11}O_2N$ _____ 9.93
Found _____ 9.99

Example 18

This example illustrates the preparation of n-hexyl N-allylcarbamate.

| | Parts | Approx. Molar Ratios |
|---|---|---|
| Potassium cyanate (94.2%) | 86.0 | 1.0 |
| Allyl chloride | 80.5 | 1.05 |
| n-Hexanol | 198.0 | 1.9 |
| Acetonitrile | 313.1 | 7.64 |

A mixture of the above ingredients was heated and agitated in an autoclave under superatmospheric pressure for 3 hours at 150° C., yielding a light-brown reaction mass. The salt which was filtered from this mass contained a considerable amount of unreacted potassium cyanate. Distillation of the filtrate gave 82 parts (44% yield) of crude n-hexyl N-allylcarbamate which boiled at 100°-107° C. at 0.05 mm. The crude product was purified by redistillation to yield a product boiling at 97° C. under a pressure of 0.05 mm. and showing the following upon analysis for nitrogen:

Percent N
Calculated for $C_{10}H_{19}O_2N$ _____ 7.57
Found _____ 7.43

Example 19

This example illustrates the preparation of β-hydroxyethyl N-allylcarbamate, the formula for which is XIV
$$CH_2=CH-CH_2-NH-\overset{\overset{O}{\|}}{C}-O-CH_2-CH_2-OH$$

| | Parts | Approx. Molar Ratios |
|---|---|---|
| Potassium cyanate | 81.0 | 1.0 |
| Allyl chloride | 76.5 | 1.0 |
| Ethylene glycol | 278.9 | 4.5 |

The allyl chloride was added from a dropping funnel over a 2-hour period to a stirred mixture of the potassium cyanate in the glycol at a bath temperature of 100°-135° C. The mixture was then heated at 130° C. for 40 minutes. The white crystalline salt which was filtered from the hot reaction mass contained no potassium cyanate.

The excess glycol was removed from the filtrate under reduced pressure, the distillate boiling at 109° C. at 20 mm. pressure. From the remaining reaction mass there was obtained 43 parts of liquid boiling within the range of 90°-147° C. under a pressure of 0.25 to 1 mm. This liquid fraction was redistilled using a Vigreux column. Cut I boiled at 65°-99° C. under a pressure of 0.35 to 0.2 mm. Cut II, which was fairly pure β-hydroxyethyl N-allylcarbamate, biled at 99.5°-108° C. under a pressure of 0.2 mm. It was soluble in water in all proportions. An analysis of Cut II for nitrogen gave the following results:

Per cent N
Calculated for $C_6H_{11}O_3N$ _____ 9.66
Found _____ 9.92

Example 20

This example illustrates the preparation of ethylene bis(N-allylcarbamate), the formula for which is XV
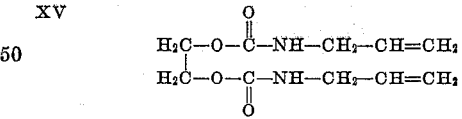

| | Parts | Approx. Molar Ratios |
|---|---|---|
| Potassium cyanate | 86.0 | 1.0 |
| Allyl chloride | 80.5 | 1.5 |
| Ethylene glycol | 37.0 | 0.6 |
| Acetonitrile | 313.1 | 7.64 |

The reaction between the above ingredients was carried out at 150° C. for 3 hours under a pressure of about 100 pounds per square inch while agitating the mass. The reaction mass was filtered and the filtrate distilled at a slightly reduced pressure until the acetonitrile was removed. An equal amount of benzene was mixed with the residue. Attempted extraction with 62 parts of water gave complete solution and, therefore, 200 parts of benzene was added. The two layers were separated after the mixture had been neutralized with a few drops of acetic acid. The benzene solution was distilled, giving the following fractions after the removal of benzene:

| Cut | B. P., °C. | Pressure | Parts | Product |
|---|---|---|---|---|
| I | 52–113 | 0.4–0.15 | 18.0 | |
| II | 114–128 | 0.15 | 23.0 | |
| III | 129–162 | 0.15–0.25 | 36.5 | Ethylene bis (N-allyl carbamate). |
| IV. Residue | | | approx. 5.0 | |

The water was distilled from the aqueous portion, leaving 21 parts of material which distilled as follows:

| Cut | B. P., °C. | Pressure | Parts | Product |
|---|---|---|---|---|
| A | 55–60 | 0.1–0.2 | 3.5 | Glycol. |
| B | 113–128 | 0.2–0.3 | 10.0 | β-hydroxyethyl N-allylcarbamate. |
| C. Residue | | | 5.0 | Ethylene bis(N-allylcarbamate). |

Fraction II was redistilled giving 16 parts of liquid, B. P. 115°–118° C. at 0.15 mm., which was soluble in both benzene and water and gave the following analysis:

Per cent N
Calc. for β-hydroxyethyl N-allylcarbamate  9.66
Calc. for ethylene bis(N-allylcarbamate) __ 12.28
Found _____ 10.37

This fraction was probably a mixture of the two carbamates. There was also obtained from Fraction II 5.5 parts of ethylene bis(N-allylcarbamate).

The total yield of ethylene bis(N-allylcarbamate) was 47 parts or 41% of the theoretical. Crystalline plates were obtained from hot water in which it was less than 10% soluble. A sample which had been crystallized from a cyclohexane-benzene mixture melted at 100° C. and gave the following analysis:

| | Percent C | Percent H | Percent N |
|---|---|---|---|
| Calculated for $C_{10}H_{16}O_4N_2$ | 52.63 | 7.02 | 12.28 |
| Found | 52.60 | 7.01 | 12.31 |
| | 53.30 | 7.00 | 12.54 |
| | 53.19 | 7.20 | |

*Example 21*

| | Parts | Approx. Molar Ratios |
|---|---|---|
| Allyl chloride | 241 | 3.15 |
| Potassium cyanate | 262 | 3.0 |
| Ethylene glycol | 102 | 1.65 |
| Acetonitrile | 939 | 22.9 |

The mixture was heated and agitated for 3 hours at 150° C. in an autoclave under superatmospheric pressure, and then worked up as in the preceding run. There was obtained a 56% yield of ethylene bis(N-allylcarbamate) and a 20% yield of β-hydroxyethyl N-allylcarbamate.

*Example 22*

| | Grams | Approx. Molar Ratios |
|---|---|---|
| Potassium cyanate (100 mesh) | 40.6 | 0.5 |
| Benzyl chloride | 63.4 | 0.5 |
| Methanol (anhydrous) | 395.0 | 12.3 |
| Magnesium salt of dioctyl sulfosuccinate (wetting agent) | 0.3 | |

The finely divided potassium cyanate and the aforementioned wetting agent were added to the methanol, after which the mixture was stirred for 30 minutes in a reaction vessel placed in an oil bath maintained at about 85° C. The benzyl chloride was then added to this mixture over a period of 30 minutes, after which the mixture was heated with agitation under reflux (bath temperature of 95°–100° C.) for 7 hours. The salt was filtered off and washed with 25 ml. of methanol, and the filtrate was concentrated to 100 ml. and again filtered. Distillation gave 59 grams of colorless distillate, B. P. 162°–170° C. The distillate was treated with 25 ml. of hexane, chilled to 0° C., filtered, chilled to —20° C. and again filtered. The yield of methyl N-benzylcarbamate, M. P. 58°–62° C., thereby obtained was 16.5 grams, which corresponds to 20% of the theoretical. The liquid residue distilled at 77°–85° C. at 24 mm. pressure and consisted mainly of benzyl chloride plus some benzyl alcohol.

It will be understood, of course, by those skilled in the art that my invention is not limited to the particular reactants, proportions thereof, solubilizing agent and proportion thereof, nor to the conditions of reaction, as given in the foregoing examples by way of illustration. Thus, instead of potassium cyanate or sodium cyanate, any of the other alkali-metal cyanates can be used; and instead of benzyl chloride or allyl chloride, any other active hydrocarbon halide, more particularly an active alkyl, aralkyl, alkenyl or aralkenyl chloride, bromide or iodide, numerous examples of which have been given hereinbefore, can be used. Also, instead of methanol, n-butanol, n-hexanol, allyl alcohol or ethylene glycol, I can use various other monohydric or dihydric alcohols, preferably a normally liquid monohydric or dihydric alcohol, numerous examples of which have been given hereinbefore. Additional examples of such alcohols are crotyl alcohol, 3-hydroxy-1-butene, 2-cyclopentenol, 2-cyclohexenol, 1-hydroxy-2,3-butadiene, 3-chloro-2-butene-1-ol, phenylethyl alcohol, isoöctyl alcohol, ethylene glycol monomethyl ether, diethylene glycol monomethyl ether, ethylene glycol monoethyl ether, ethylene glycol monophenyl ether, diethylene glycol monoethyl ether, ethylene glycol monobutyl ether, ethylene glycol ethylbutyl ether, diethylene glycol monobutyl ether, propylene glycol, dipropylene glycol, ethylhexanediol, polyethylene glycols having the general formula

$$HOCH_2(CH_2OCH_2)_nCH_2OH$$

where $n$ is a value such that the glycol has an average molecular weight ranging from about 200 to about 700, 2-methoxymethyl-2,4-dimethylpentanediol - 1,5, 2 - ethoxymethyl - 2,4 - dimethylpentanediol - 1,5, butanediol - 1,3(butylene glycol), octylene glycol, pentamethylene glycol, decamethylene glycol, 2-butene-1,4-diol, etc. Additional examples of unsaturated alcohols that can be used are given in the copending application of Harry Fred Pfann and Edward L. Kropa, Serial No. 738,736, filed April 1, 1947, now Patent No. 2,609,358, dated Sept. 2, 1952. The use of monohydric and dihydric alcohols of higher molecular weight than those mentioned herein by way of example is not precluded, but, in general, the higher-molecular-weight alcohols which are not normally liquids at 30° C. or lower are less satisfactory for use because of the greater difficulty in dissolving the alkali-metal cyanate in the reaction mass containing such higher boiling alcohols of higher molecular weight.

In my copending divisional application Serial No. 357,927, filed May 27, 1953, claims are made to triallyl isocyanurate and to a composition containing triallyl isocyanurate and diallylurea; and in my copending divisional application Serial No. 357,928, also filed May 27, 1953, claims are made to various N-substituted carbamates including allyl-N-allylcarbamate, β-hydroxethyl N-allylcarbamate and ethylene bis(N-allylcarbamate).

I claim:

1. The method of preparing an N-substituted carbamate which comprises effecting simultaneous reaction, at a temperature within the range of about 100° C. to about 200° C., between (1) an alkali-metal cyanate, (2) a hydrocarbon halide represented by the formula RX, where X represents halogen and R represents a radical selected from the class consisting of alkyl, alkenyl, aralkyl and aralkenyl radicals and (3) an alcohol selected from the class consisting of normally liquid monohydric and dihydric non-aromatic alcohols, and isolating the N-substituted carbamate thereby produced from the resulting reaction mass.

2. A method as in claim 1 wherein the alkali-metal cyanate is potassium cyanate, the alcohol is a normally liquid monohydric non-aromatic alcohol and the hydrocarbon halide is an alkenyl chloride.

3. A method as in claim 1 wherein the alkali-metal cyanate is potassium cyanate, the hydrocarbon halide is an alkenyl chloride and the alcohol is a normally liquid dihydric non-aromatic alcohol.

4. The method of preparing an N-substituted carbamate which comprises heating under superatmospheric pressure, at a temperature within the range of about 100° C. to about 175° C., a mixture containing (1) an alkali-metal cyanate, (2) a hydrocarbon halide represented by the formula RX, where X represents halogen and R represents a radical selected from the class consisting of alkyl, alkenyl, aralkyl and aralkenyl radicals, and (3) an alcohol selected from the class consisting of normally liquid monohydric and dihydric non-aromatic alcohols, and isolating the N-substituted carbamate thereby produced from the resulting reaction mass.

5. A method as in claim 4 wherein the alkali-metal cyanate is potassium cyanate, the hydrocarbon halide is an alkenyl chloride, and the alcohol of (3) is a normally liquid monohydric non-aromatic alcohol.

6. A method as in claim 4 wherein the reaction mixture also contains an inert solubilizing agent for improving the solubility of the alkali-metal cyanate in the reaction mass.

7. A method as in claim 6 wherein the inert solubilizing agent is acetonitrile.

8. A method as in claim 1 wherein the alkali-metal cyanate is potassium cyanate, the alcohol is a normally liquid monohydric non-aromatic alcohol and the hydrocarbon halide is an aralkyl chloride.

9. A method as in claim 1 wherein the alkali-metal cyanate is potassium cyanate, the alcohol is a normally liquid monohydric non-aromatic alcohol and the hydrocarbon halide is an alkyl chloride.

10. A method as in claim 4 wherein the alkali-metal cyanate is potassium cyanate, the hydrocarbon halide is an aralkyl chloride, and the alcohol is a normally liquid monohydric non-aromatic alcohol.

11. The method of preparing an N-allylcarbamate which comprises heating under superatmospheric pressure, at a temperature within the range of about 100° C. to about 175° C., a mixture containing potassium cyanate, allyl chloride and a normally liquid, monohydric, non-aromatic alcohol, and isolating the N-allylcarbamate thereby produced from the resulting reaction mass.

12. The method of preparing methyl N-allylcarbamate which comprises heating under superatmospheric pressure, at a temperature within the range of about 100° C. to about 175° C., a mixture containing potassium cyanate, allyl chloride and methyl alcohol, and isolating the methyl N-allylcarbamate thereby produced from the resulting reaction mass.

13. The method of preparing methyl N-benzylcarbamate which comprises heating under reflux, at the boiling temperature of the mass, a mixture containing potassium cyanate, benzyl chloride and methyl alcohol, and isolating the methyl N-benzylcarbamate thereby produced from the resulting reaction mass.

14. The method of preparing an N-allylcarbamate which comprises heating under superatmospheric pressure, at a temperature within the range of about 100° C. to about 175° C., a mixture containing (1) potassium cyanate, (2) allyl chloride, (3) a normally liquid, monohydric, non-aromatic alcohol, and (4) acetonitrile as a solubilizing agent for the potassium cyanate, and isolating the N-allylcarbamate thereby produced from the resulting reaction mass.

15. A method as in claim 14 wherein the monohydric alcohol of (3) is allyl alcohol.

16. The method of preparing an N-allylcarbamate which comprises heating under superatmospheric pressure, at a temperature within the range of about 100° C. to about 175° C., a mixture containing (1) potassium cyanate, (2) allyl chloride, (3) a normally liquid, dihydric, non-aromatic alcohol, and (4) acetonitrile as a solubilizing agent for the potassium cyanate, and isolating the N-allylcarbamate thereby produced from the resulting reaction mass.

17. A method as in claim 16 wherein the dihydric alcohol of (3) is ethylene glycol.

DONALD W. KAISER.

References Cited in the file of this patent

UNITED STATES PATENTS

| Number | Name | Date |
|---|---|---|
| 2,161,615 | Dietrich | June 6, 1939 |
| 2,409,712 | Schweitzer | Oct. 22, 1946 |

FOREIGN PATENTS

| Number | Country | Date |
|---|---|---|
| 881,300 | France | Apr. 20, 1943 |
| 48,552 | Switzerland | July 17, 1908 |
| 797,286 | France | Apr. 23, 1936 |

OTHER REFERENCES

Richter's Organic Chemistry by Eric Alliot, vol. 1 (1944), p. 519.

An Outline of Organic Nitrogen Compounds by Edward Degering (1945), pp. 532–533.

Slotta, Berichte, vol. 58—pages 1320–1323 (1925).

Conant, J. B., Chem. of Organ. Cpds., 1939, pages 254–5.

Naumann—Chem. Abs., vol. 8, 1914, page 1373.